No. 747,001. PATENTED DEC. 15, 1903.
E. H. SEDDON.
PNEUMATIC TIRE.
APPLICATION FILED MAR. 17, 1903.
NO MODEL.
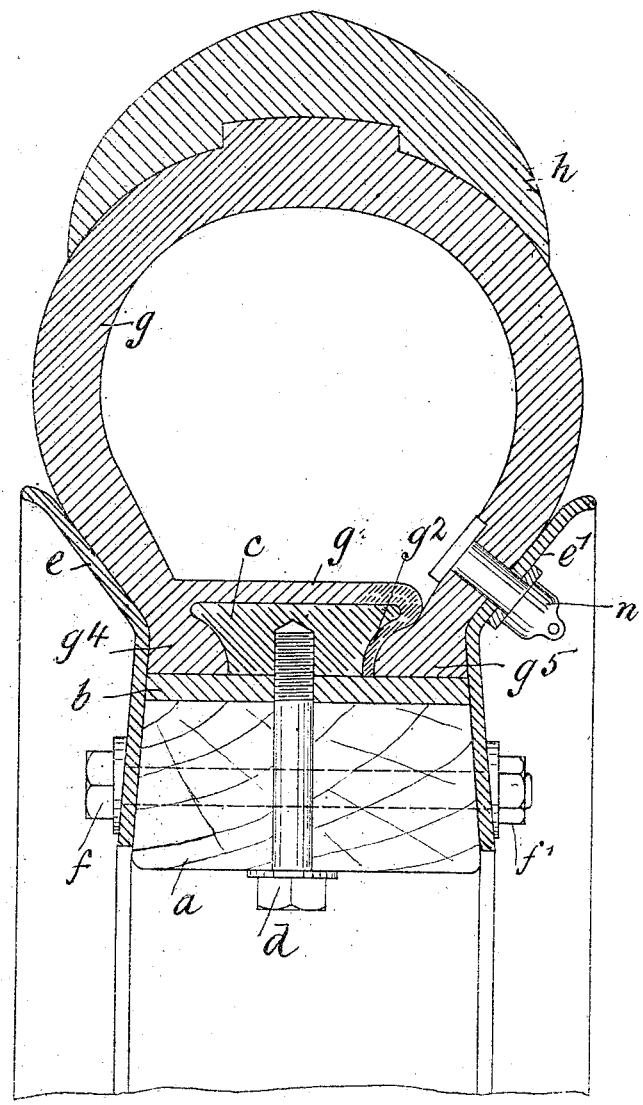
Witnesses
Inventor
Edward H. Seddon
By his attorney
Edward P. Thompson No. 747,001. Patented December 15, 1903.

UNITED STATES PATENT OFFICE.

EDWARD HENRY SEDDON, OF BROOKLANDS, ENGLAND.

PNEUMATIC TIRE.

SPECIFICATION forming part of Letters Patent No. 747,001, dated December 15, 1903.

Application filed March 17, 1903. Serial No. 148,160. (No model.)

*To all whom it may concern:*

Be it known that I, EDWARD HENRY SEDDON, a subject of the King of Great Britain, and a resident of Brooklands, in the county of Chester, England, have invented certain new and useful Improvements in Pneumatic Tires, of which the following is a specification.

This invention relates to pneumatic tires for motor-cars and the like; and it consists in an improved arrangement and means for fixing the tire to the felly.

The arch or horseshoe shaped tires without air-tube hitherto made have sides overlapping the sides of the felly and are clamped to it by means of side rings or cheeks bolted to the felly. Such tires are very difficult to put on and take off, as the sides of such tires, made chiefly of canvas, are very stiff and the internal diameter of the sides is smaller than the external diameter of the felly, which has to be passed through one of them, and it cannot be done without taking the wheel off the axle, and then only with great expenditure of labor and time. Making the lap of the sides smaller and with beads thereon fitting into grooves turned in the side of the felly only partly overcomes the difficulty and weakens the felly.

The object of this invention is to obviate these defects.

On the drawing a tire made and fixed in accordance with my invention is shown in cross-section.

Upon the felly $a$, made, as usual in motor-cars, of wood and provided with a flat hoop $b$ shrunk thereon, another hoop, $c$, is fixed by a few screws $d$. The hoop $c$ is narrower on the inside than on the outside and preferably has curved sides, so that between it and the side cheeks $e$ and $e'$, bolted to the sides of the felly by bolts $f$, provided with nuts $f'$, dovetail-like circular recesses or grooves narrower at the top of the hoop $c$ than at its base are formed, as shown. The tire $g$ is formed with a cylindrical bottom $g'$ fitting upon the top of the hoop $c$ and provided with a flat ring or annular lip $g^2$ at a right angle thereto, which ring is formed of soft india-rubber. The tire itself is formed of canvas cemented and covered inside and outside with rubber and has on the side to which the bottom $g'$ is connected a bead or enlargement $g^4$, fitting into the groove on that side which is the inside of the wheel when mounted on the axle of the car. The other side of the tire is not connected to the bottom $g'$, but formed with a bead or enlargement $g^5$ somewhat thicker than the dovetailed groove between the ring $g^2$ and the cheek $e'$, which bead is coated with soft rubber on the inside.

To fix the tire upon the felly, the cheek $e$ is first put against the inner side of the felly and the bolts $f$ pushed in. The hoop $c$ is first inserted into the tire, and the latter, with the hoop, is then pushed onto the felly and the hoop $c$ fixed by the screws $d$. The cheek $e'$ is then put on and secured by the nuts $f'$. The bead $g^5$ and flat ring or lip $g^2$ are thereby squeezed between the hoop $c$ and the bead $g^5$, and thus a tight joint is made, while the tire is secured by the beads $g^4$ and $g^5$ being gripped in the dovetailed grooves between the hoops $c$ and the cheeks $e$ and $e'$. To take off the tire, the sequence of the operations is reversed. The whole operation of taking off the tire and putting it on again occupies only a few minutes, and when taken off the interior of the tire is readily accessible for repairs. This easy removal operated from the outer side of the wheel also facilitates the use of separate treads $h$, put round the outer periphery of the tire, as these can only be put on without much difficulty when the tire is off the wheel.

The tire is inflated in the usual way through a valve $n$ of any suitable construction.

I claim as my invention—

1. In an article of manufacture a tire slit longitudinally at one side of its inner periphery and having beads at its bottom edge adapted to fit into dovetail grooves formed by a hoop surrounding the felly and fixed thereto and cheeks attached to the sides of the felly, one of said edges being formed with a cylindrical bottom extending across said hoop and having a lip of soft rubber at a right angle thereto adapted to be compressed by the other edge of the tire against the side of said hoop.

2. The combination with a wheel-felly and side cheeks forming a channel attached thereto, of a hoop surrounding said felly and fixed thereto, said hoop being wider at its outer than at its inner periphery, a tire of arched shape having one side formed with a bead adapted to fit the groove between the hoop and the inside cheek, a cylindrical bottom formed with said side and extending over said hoop, a circular lip of soft rubber formed with said bottom adapted to lie against the outer side of said hoop, a bead at the bottom of the outer side of said tire adapted to fit into the groove between the hoop and outer cheek and to compress said lip when the outer cheek is bolted to the wheel.

In testimony whereof I have hereunto set my hand in the presence of two witnesses.

EDWARD HENRY SEDDON.

Witnesses:
CARL BOLLE,
ROBERT A. COLLINGS.